(12) United States Patent
Garyantes (10) Patent No.: US 6,463,048 B1
(45) Date of Patent: Oct. 8, 2002

(54) CODE GENERATOR FOR MULTIPLE RAKE FINGER AND METHOD OF USE

(75) Inventor: Michael F. Garyantes, Warren, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/357,769

(22) Filed: Jul. 21, 1999

(51) Int. Cl.[7] .............................................. H04B 7/216
(52) U.S. Cl. ...................................................... 370/342
(58) Field of Search ................................ 370/342, 441, 370/252, 335–338, 503, 328–330, 343–345; 375/200–208, 130–134, 140, 144, 145, 143, 150–155, 343–362, 330, 367, 341; 455/296, 302, 63–65

(56) References Cited

U.S. PATENT DOCUMENTS

| | | | |
|---|---|---|---|
| 5,155,744 A | * 10/1992 | Ringelhaan | 375/341 |
| 5,347,535 A | 9/1994 | Karasawa et al. | |
| 5,361,276 A | * 11/1994 | Subramanian | 375/150 |
| 5,598,428 A | 1/1997 | Sato | |
| 5,640,431 A | 6/1997 | Bruckert et al. | |
| 5,684,793 A | 11/1997 | Kiema et al. | |
| 5,719,899 A | 2/1998 | Thielecke et al. | |
| 5,737,326 A | 4/1998 | I et al. | |
| 5,740,208 A | 4/1998 | Hulbert et al. | |
| 5,764,688 A | 6/1998 | Hulbert et al. | |
| 5,768,307 A | * 6/1998 | Schramm et al. | 375/208 |
| 5,920,555 A | * 7/1999 | Hulbert | 370/342 |
| 5,982,763 A | * 11/1999 | Sato | 370/342 |
| 6,023,615 A | * 2/2000 | Bruckert et al. | 375/347 |
| 6,026,115 A | * 2/2000 | Higashi et al. | 375/200 |
| 6,094,449 A | * 7/2000 | Komatsu | 375/136 |
| 6,137,785 A | * 10/2000 | Bar-Ness | 370/328 |
| 6,151,328 A | * 11/2000 | Kwon et al. | 370/441 |

* cited by examiner

Primary Examiner—Kwang Bin Yao
Assistant Examiner—Prenell Jones
(74) Attorney, Agent, or Firm—Dickstein, Shapiro, Morin & Oshinsky (57) ABSTRACT

In a CDMA communication system, a multiple rake finger is coupled to a plurality of antennae. The multiple rake finger includes one correlator per antenna. The correlators in the multiple rake finger are coupled, via a delay circuit, to a single code generator. The delay circuit compensates for delays which occur in transmission as well as delays due to the separate distance of the antennae.

26 Claims, 8 Drawing Sheets

CODE GENERATOR FOR MULTIPLE RAKE FINGER AND METHOD OF USE

BACKGROUND OF THE INVENTION

1. Field of the Invention

This invention relates generally to telecommunications equipment, and particularly to a device and method for use in a Code Division Multiple Access (CDMA) telecommunications system.

2. Description of the Related Art

Code Division Multiple Access (CDMA) transmission schemes have become increasingly popular due to the recent growth of the wireless industry. CDMA is a spread spectrum technique whereby data signals are modulated by a pseudo-random signal, known as a spreading code, before transmission. The modulation of the data signals spreads the spectrum of the signals and makes them appear like noise to an ordinary receiver. However, when the same pseudo-random signal is used to demodulate (despread) the transmitted data signal at the CDMA receiver, the data signal can be easily recovered.

An additional advantage of CDMA is that data signals from multiple users can be transmitted simultaneously on the same frequency band. Users are differentiated from one another at the CDMA receiver by spreading codes. Correlators provided at the receiver of the CDMA system recognize each different spreading code and restore (despread) the original data signal. These correlators are often arranged into units called "rakes" or "rake fingers," the function of which is to assemble and demodulate one received multipath propagated signal component. Each rake finger typically includes one or more correlators and one or more pseudo-random code generator associated with each correlator, each pseudo-random code generator being associated with one correlator. The multiple rake fingers are used to detect the strongest multipath components as described below. Each correlator detects a time shifted version of the original transmitted data signal.

One problem that CDMA and other similar transmission schemes must deal with is multipath propagation. Multipath propagation is a phenomenon which causes many different versions of a transmitted signal, called multipath components, to be created and propagated to a receiver. The multipath components are created because the transmission antenna radiates the data signal in many directions (omnidirectionally), and therefore creates more than one component. Each of these different multipath components may arrive at the receiver at different times due to delays created by obstacles in the respective transmission paths. In other words, since the data signals are transmitted over the airspace between the transmitters and receivers, the transmitted signals will incur delays due to the surrounding environment (e.g. they will bounce off buildings and other structures in the transmission path). Hence, the same data signal may arrive at the receiver (or receivers) at different times. Depending on the environment, the multipath components may combine with each other constructively or destructively. Destructive combination causes the multipath components to effectively cancel each other out. Thus, if the multipath components combine with each other destructively, portions of, or the entire data signal may lost.

CDMA systems deal with the problem of multipath propagation by providing multiple antennas to receive the signal and multiple rake fingers. A receiver that includes multiple reception antennae is often referred to as a diversity receiver. Typically, both antennas will not experience the destructive combination of multipath components simultaneously and each rake finger can handle one multipath component from one antenna to overcome the time delays. For example, a CDMA receiver may have three rake fingers dedicated to the transmissions of a single user, to accommodate three different multipath components. Each one of the rake fingers receives a different multipath portion of the transmitted signal from one of the receiving antennas, each portion having a different associated time delay. The CDMA receiver is fabricated to recognize the different time delays and coordinate the multipath signals so that the original data signal can be retrieved from the multipath components.

Figure 1:
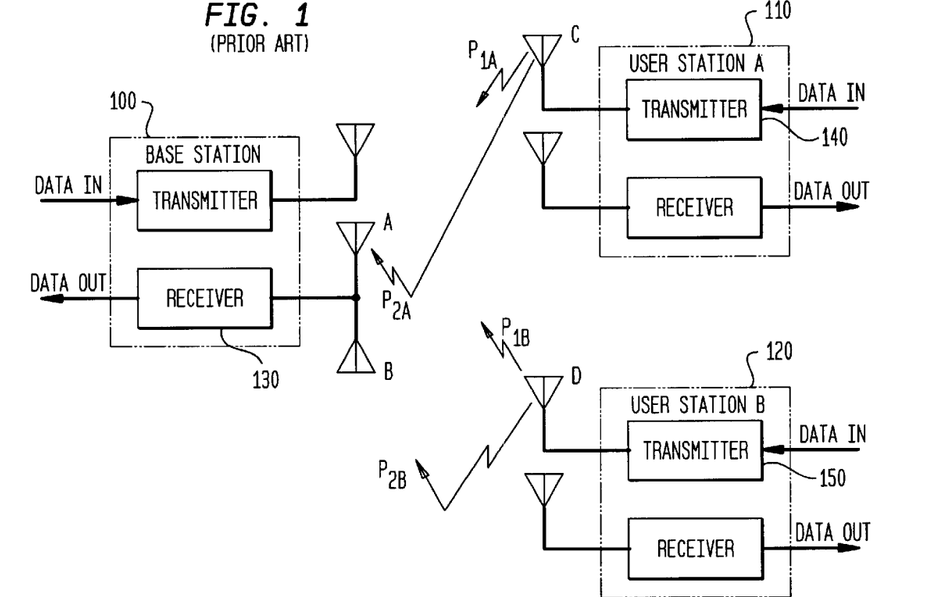
FIG. 1 is a block schematic diagram illustrating a basic two-antenna CDMA communication system.

FIG. 1 shows an example of a wireless system utilizing such a CDMA architecture and transmission scheme. There is shown a base station 100 and multiple user stations 110 and 120 (e.g. wireless phones). Each user station 110, 120 has an associated transmitter 140, 150, for transmitting signals to the base station 100. The base station 100 includes two receiving antennae A and B, connected to a receiver 130 for receiving signals from the multiple user stations 110, 120. As previously noted such a receiver, including multiple reception antennae (i.e. A and B), is often referred to as a diversity receiver. Connected to each user transmitter 140, 150 are transmission antennae C, D respectively. Each user station 110, 120 transmits data signals (i.e. messages) over their respective transmission antennae C, D, to the reception antennae A, B, and through to receiver 130. The base station 100 receives the transmitted data signals, and relays the data (e.g. messages) to other users of the system.

As stated previously, each data signal may follow different paths to the base station receiver 130. For example, these paths are shown as transmission paths $P_{1A}$ and $P_{2A}$ from user station 110, and paths $P_{1B}$ and $P_{2B}$ from user station 120. Although only two multipath components are shown for each user station, any number of multipath components may exist for each transmitted data signal. In most cases, it should be noted that only a few multipath components are dominant (i.e. only a few multipath components are worth considering due to the weak signal strength of the various other non-dominant components). Further, although the multipaths are only shown for transmission from a user station 110,120 to the base station 100, it should be noted that the same multipath components are present when transmitting data from the base station 100 to the individual user stations 110, 120, etc. Therefore, the receivers located at the user stations 110, 120 must also include rake fingers for handling multipath components.

As stated above, in present CDMA receivers, each rake finger includes at least one correlator and a separate pseudo-random code generator for each correlator. In systems with multiple receiving antennae at the base station, such as antennae A and B in FIG. 1, the multiplicity of rake fingers creates a problem in that a large number of code generators are required (i.e., one for each correlator of each antenna).

Figure 2:
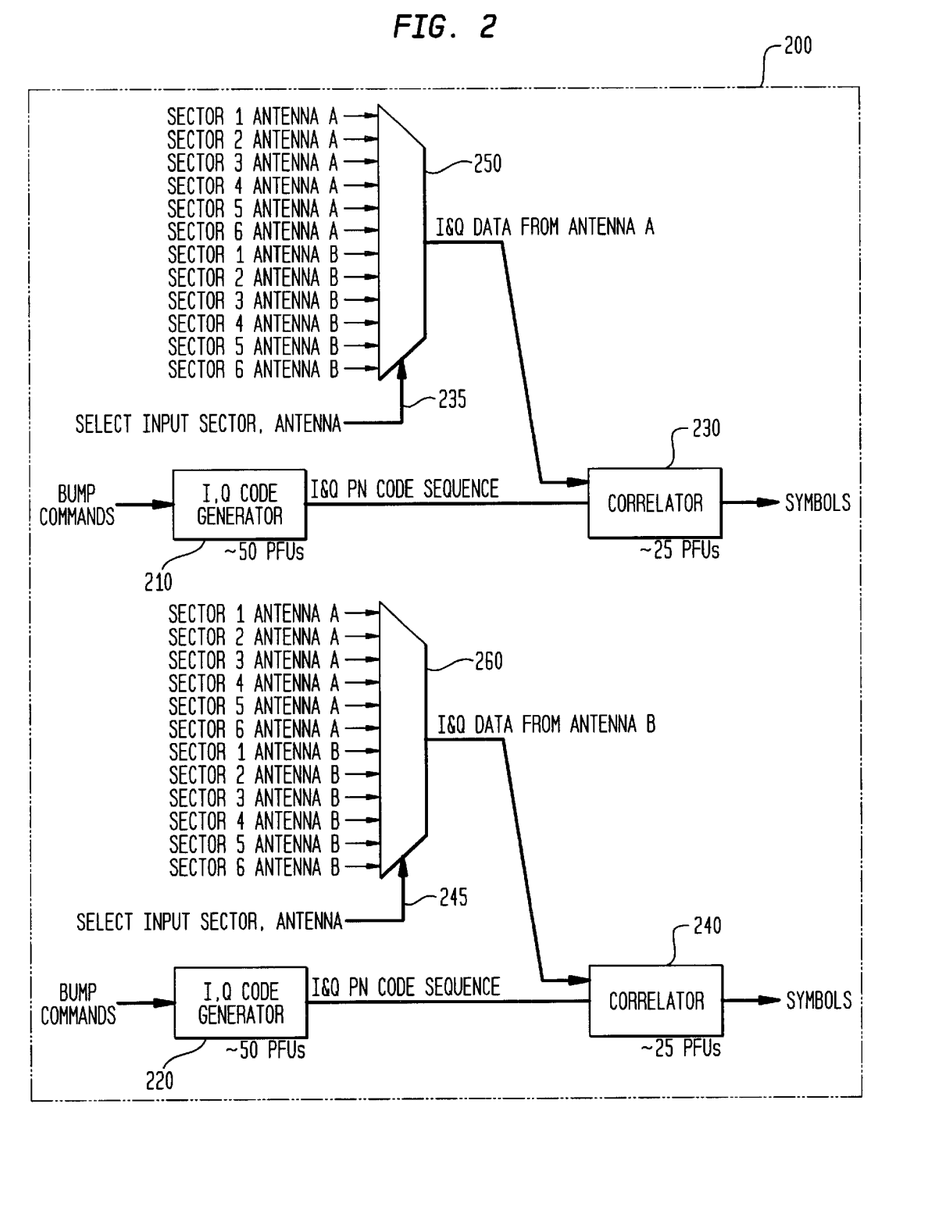
FIG. 2 is a block schematic diagram illustrating a first prior art rake finger arrangement.

FIG. 2 shows the traditional rake finger 200 for a dual-antenna diversity receiver. As can be seen, the rake finger 200 includes first and second code generators 210, 220, and first and second correlators 230 and 240. Multiplexers 250, 260 connect the two antennae (e.g. A and B) to each correlator 230, 240. The multiplexers 250, 260 are controlled by control signals 235, 245 which select the antenna and sector of the cell from which the rake finger is currently receiving data signals. Although the multiplexers 250, 260 allow the correlators 230, 240 to receive signals from either antenna, for purposes of this discussion it will be assumed that correlator 230 receives data signals from antenna A only, and correlator 240 receives signals from antenna B only. Thereby, the rake finger 200 forms a single rake finger unit for reception of one multipath signal on both antennas. The base station receiver 130 shown in FIG. 1 includes multiple rake fingers 200. Although the device shown in FIG. 2 is referred to above as a single rake finger, it may also comprise two separate rake fingers, one for the code generator 210, correlator 230, and multiplexer 250, and one for the code generator 220, correlator 240 and multiplexer 260.

Figure 1A:
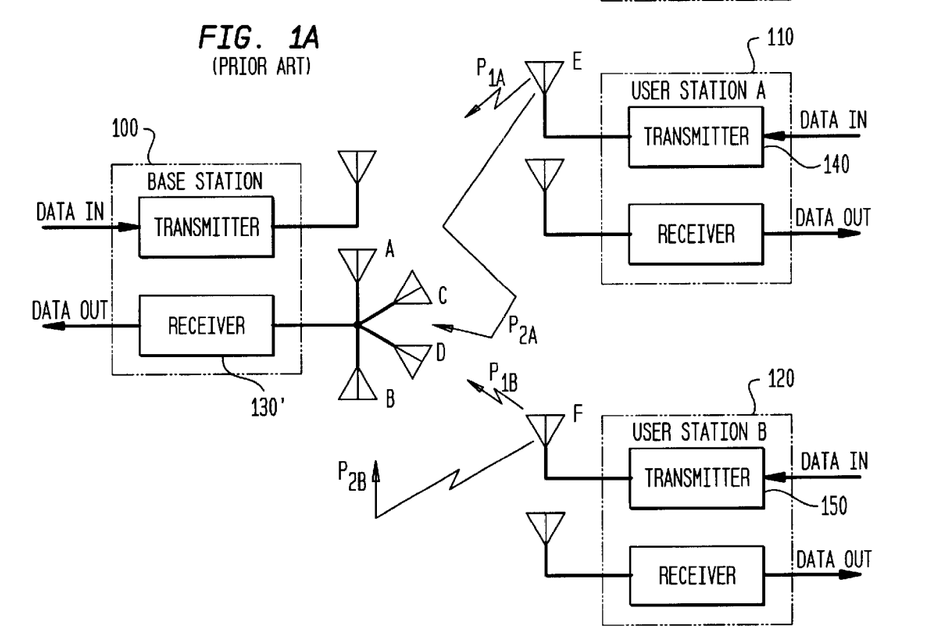
FIG. 1A is a block schematic diagram illustrating a basic four-antenna CDMA communication system.
Figure 5A:
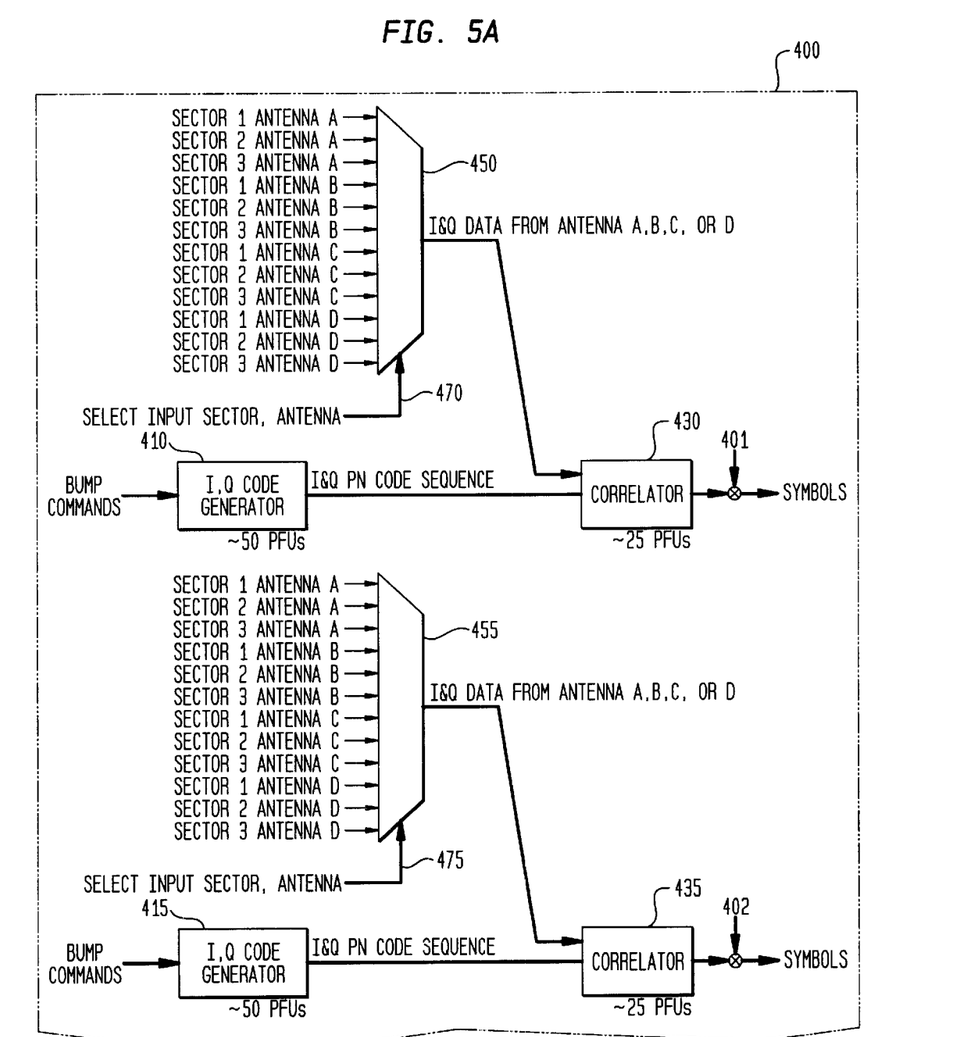
FIG. 5 is a block schematic diagram illustrating a second prior art rake finger arrangement.
Figure 5B:
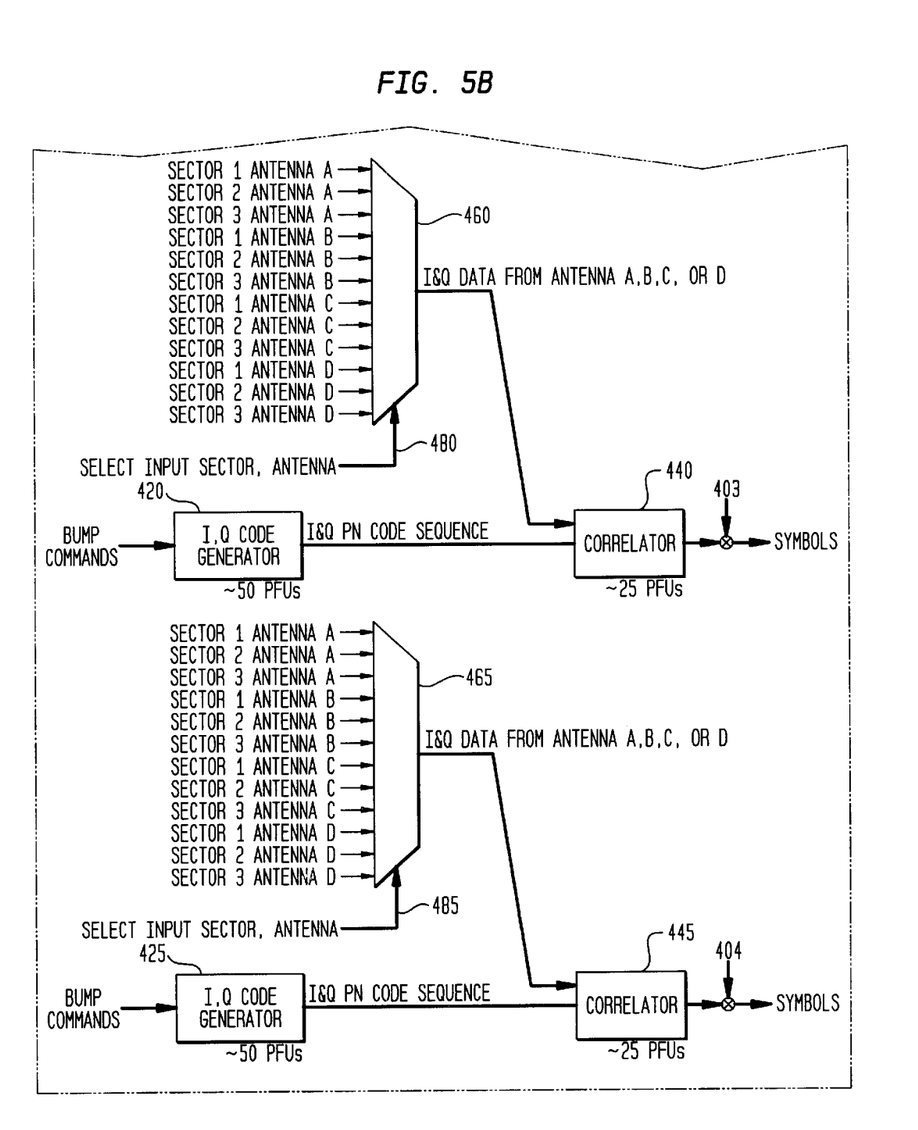

FIG. 5 shows another conventional rake finger 400. Rake finger 400 is similar in many respects to rake finger 200 shown in FIG. 2, except that it is configured for a quad-antenna system (i.e. 4 antennae) instead of a dual-antenna system. Rake finger 400 also includes beamforming inputs 401–404, which assist in dividing the antenna coverage into sectors. The beamforming inputs 401–404 restrict the signals output from the correlators 430–445 to those of a single antenna (e.g. antenna A) and a single sector (e.g. sector 2). Rake finger 400 is configured for use with the transmission scheme shown in FIG. 1A, which includes a receiver 130' with four antennae A–D. The remainder of the transmission system is essentially the same as the system described above with reference to FIG. 1, where similar reference numerals indicate similar parts. Rake finger 400 includes first through fourth code generators 410–425, and first through fourth correlators 430–445. Multiplexers 450–465 connect each antennae (e.g. A–D) to each respective correlator 430–445. The multiplexers 450–465 are controlled by control signals 470–485 which select the antenna and sector of the cell from which the rake finger is currently receiving data signals. Although the multiplexers 450–465 allow the correlators 430–445 to receive signals from any of the antennae, for purposes of this discussion it will be assumed that correlator 430 receives data signals from antenna A only, correlator 435 receives signals from only antenna B, correlator 440 receives signals from only antenna C, and correlator 445 receives signals from only antenna D. Thereby, the rake finger 400 forms a single unit for reception of one multipath signal on all four antennae. As stated above with reference to FIG. 2, the base station receiver 130 shown in FIG. 1 typically include multiple rake fingers 400. Although the device shown in FIG. 5 is referred to above as a single rake finger, it may also comprise four separate rake fingers, one for each antenna A–D. When the device comprises four separate rake fingers, each rake finger includes a code generator, a correlator, and a multiplexer.

The number of rake fingers 200 (or 400) in the receiver 130 is dependent on the number of users of the system, the number of antennae, and the number of multipath components which are used to demodulate the transmitted signal. For example, in a dual-antenna (quad-antenna) system if there were five users, with each user having one rake finger 200 (400) dedicated to his or her multipath components, the receiver would require five rake fingers 200 (400), and therefore ten (twenty) code generators. In most CDMA receivers, however, each user has at least three rake fingers assigned to him or her, thereby pushing the totals up to fifteen rake fingers and thirty (sixty) code generators. This per receiver multiplicity of rake fingers and code generators causes the cost of each CDMA receiver to be relatively high. Additionally, the size, power usage and complexity of the receiver is necessarily increased. Hence, there is presently a need for a base station receiver structure which accommodates multiple antennae, but which also does not similarly increase the size, cost, and complexity of the receiver circuitry.

SUMMARY OF THE INVENTION

In view of the foregoing defects, and for other reasons, the present invention is directed to a CDMA system which reduces the size and cost of present CDMA base station receiver by utilizing a single code generator for a set of antennae and accommodating delays present in multiple antenna receivers.

An object of the present invention is to provide an apparatus for providing a digital radio link between at least one fixed unit and at least one mobile unit, where the fixed unit has at least two antennae located at the fixed unit. A receiver is connected to the two antennae and includes at least one multiple rake finger. The multiple rake finger comprises a code generator and at least two correlators corresponding to the two antennae, wherein the code generator provides pseudo-random signals to both of the correlators.

Another object of the invention is to provide a method of operating a digital transmission system comprising the steps of receiving a signal on at least two different antennae, transmitting the signal to at least two correlators, each correlator corresponding to a different antenna, and transmitting a pseudo-random code to the two correlators, wherein the code is generated by a single code generator.

Another object of the invention is to provide a multiple access digital receiver comprising at least one multiple rake finger, the multiple rake finger comprising a code generator and at least two correlators, wherein the code generator provides pseudo-random signals to both of the correlators.

Another object of the invention is to provide a searcher for use with a multiple access digital communication system comprising at least one multiple rake finger, the multiple rake finger comprising a code generator and at least two correlators, wherein the code generator provides pseudo-random signals to both of the correlators.

To accomplish the above objects there is described a multiple rake finger which provides a single code generator for a set of correlators, each correlator corresponding to a separate antenna. The multiple rake finger includes delay circuitry located between the code generator and the correlators for coordinating the code signal with the received signal. The delay circuitry also compensates for the time delay between the antennae.

The above and other advantages and features of the present invention will be better understood from the following detailed description of the preferred embodiments of the invention which is provided in connection with the accompanying drawings and claims.

DETAILED DESCRIPTION OF THE PREFERRED EMBODIMENTS

Figure 3:
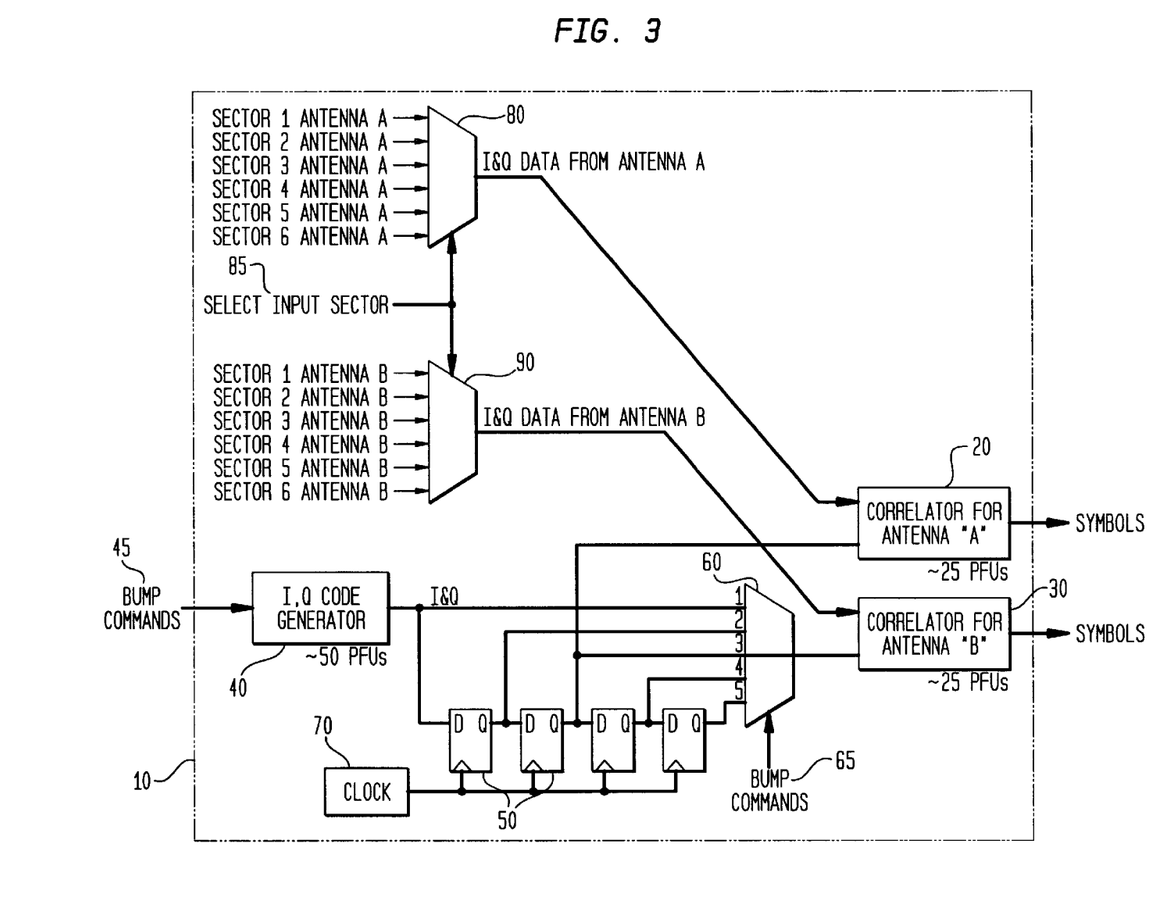
FIG. 3 is a block schematic diagram illustrating a first embodiment of the rake finger of the present invention.

We now refer to the Figures, wherein like reference numerals refer to like elements. Specifically, FIG. 3 shows the rake finger structure 10 of a first embodiment of the present invention. The transmission structure of the first embodiment of the present invention is the same as that shown in FIG. 1, except that the receiver 130 has been modified to include the rake finger 10, rather than the rake finger 200 shown in FIG. 2. It should be noted that the rake finger 10 shown in FIG. 3 is only a small portion of the base station receiver 130. In reality, more than one rake finger would be contained within the receiver 130 along with various other elements (e.g. demodulators, filters, etc.). The rake finger shown in FIG. 3 will hereinafter be referred to as a "multiple" rake finger, since the rake finger 10 comprises a pair of correlators 20, 30 for one code generator 40, as opposed to prior rake fingers(e.g. 200; FIG. 2) which included a separate code generator 210, 220 for each correlator 230, 240.

The base station receiver for use with the multiple rake finger 10 of the first embodiment of the present invention preferably comprises two antennae for receiving signals from the multiple users of the system, as shown in FIG. 1. This dual antenna (diversity) system minimizes the problems associated with multipath signal propagation by providing two reception antennae, instead of one. As stated above, when a signal is sent from a transmitter it is radiated in many directions as a plurality of multipath components. The antennae are separated by a small distance (e.g. 3 meters), so that each antenna receives a different set of multipath components from each transmitter (e.g. 110, 120). The antenna (e.g. antenna B) that is further from the transmitter (e.g. 140) receives multipath components which are time delayed with respect to the multipath components received at the first, closer, antenna (e.g. antenna A), because it takes longer for the multipath components to reach the farther antenna. Thus, if multipath components from one of the transmitters combine destructively (i.e. cancel each other out by arriving at the same time with opposite phases) at one antenna, it is unlikely that the components will combine destructively at the other antenna because of the time delay difference between antennae. Therefore, one of the two antennae will be able to receive the incoming transmission in almost all multipath scenarios.

Each data signal sent by a user of the system comprises several multipath components as described above with reference to FIG. 1. Each multipath component in turn includes an In (I) phase (real) element and a Quadrature (Q) phase (imaginary) element 90° out of phase with the I element as is known in the art. These I and Q elements of a multipath component are received by the two receiving antennae A and B located at the base station 100 and are fed to the proper correlator 20, 30 (i.e. signals received by antenna A are fed to the correlator for antenna A) via multiplexers 80 and 90 as shown in FIG. 3. The multiplexers 80, 90 are switched between the different sectors of each antenna by a single control signal 85. Since both antennas will always be monitoring the same sector, there is no need for two separate control signals, as is the case with the multiplexers 250, 260, shown in FIG. 2.

Each correlator 20, 30 is connected to a pseudo-random code generator 40 for providing demodulating (despreading) codes. The demodulating codes at the receiver are matched to the modulating codes at the transmitter (i.e. user station) so that the data signal sent by the user can be restored from the transmitted spread spectrum signal. The code generator 40 is connected to each correlator 20, 30 with a different delay. The delays between the code generator 40 and the correlators 20, 30 are created by a set of series-connected flip-flops 50 which are clocked by clock generator 70. Correlator 20 receives a code signal delayed by a set amount number of flip-flops 50, whereas correlator 30 receives a code signal which is delayed by a variable number of flip-flops 50, the number of flip-flops being selected by multiplexer 60. Controlling the multiplexer 60 is a first control signal 65 which switches the multiplexer between different delay states (i.e. different numbers of flip-flops 50). The code generator 40 can also be time-delayed by a second control signal 45. Therefore, by utilizing the first 65 and second 45 control signals, two separate levels of delay can be provided. In other words, if the pseudo-random code which is input to both correlators 20, 30 must be delayed, control signal 45 is used, however, if the one correlator (20 or 30) must be delayed with respect to the other correlator, control signal 65 must also be used. The multiplexer 60 includes five delay states, labeled 1–5 in FIG. 3. The different delay states can provide from no delay (state 1) up to a four flip-flop delay (state 5). The actual amount of time delay provided to the correlators 20, 30 depends on the period of the clock signal from the clock generator 70. For example, if each flip-flop provided 1 microsecond ($\mu$s) of delay, and correlator 20 had to be delayed by 5 microeconds and correlator 30 had to be delayed by 3 microseconds, a 3 microsecond delay would be provided by control signal 45 (thereby providing a 5 $\mu$s delay to correlator 20 by virtue of the first two flip-flops 50), and the multiplexer would be set to position 1 by control signal 65 thereby providing the 3 $\mu$s delay to correlator 30.

The operation of the transmission scheme contemplated by the present invention will be next described. When a wireless user transmits a signal, for instance by speaking a message over a wireless phone, the signal is transmitted omnidirectionally from the phone antenna to the base station for the particular cell where the user is located. As the data signal is radiated in all directions, certain portions (multipath components) travel straight to the base station antenna, and other portions (different multipath components) are reflected off objects and refracted around objects. So, different versions of the signal reach the base station receiver at different times depending on the path each portion takes. Obviously, the more objects that a portion of the signal reflects off of the longer it will take to reach the base station. For example, if one portion travels directly to the base station antenna, without any reflections or refractions, it might experience a first time delay $D_1$. Another portion of the same data signal may reflect off of a building and then be directed towards the base station antenna, and experience a second time delay $D_2$, where $D_2 > D_1$. These time delays are compensated for in the receiver by similarly time-delaying the pseudo-random code which is correlated with each multipath component.

The receiver for use with the present invention preferably includes several multiple rake fingers 10 like the one shown in FIG. 3 for receiving the multipath components. As stated above, one or more of these multiple rake fingers 10 are dedicated to each user of the system. The number of multiple rake fingers 10 that are dedicated to a particular user indicates the number of multipath components that will be used to demodulate the signal transmitted by that user. For instance, if the receiver uses three multipath components (which is most commonly the case) to demodulate the data signals of each user, then three multiple rake fingers 10, and consequently three code generators, will be required for each user. In prior art systems, at least twice as many code generators (i.e. six) would have been required for such a transmission scheme. So, as can be seen, the multiple rake finger 10 of the present invention reduces the amount of circuitry required for code generation at the receiver by approximately fifty percent.

Now, the operation of the multiple rake finger 10 is described with reference to FIG. 3. When a multiple rake finger 10 receives a multipath component (i.e. I and Q data as described above), the component is fed to each of the two correlators 20 and 30, shown in FIG. 3 by the multiplexers 80 and 90. The correlators 20, 30 are fed pseudo-random codes from code generator 40 at various time delays. The time delay of the code generator must be set to coincide with the time delay of the multipath component, or the transmitted signal cannot be received. The code generator 40 may be time delayed by control signal 45, and the correlators may be further time delayed by control signal 65. An Early-Late Gate Correlator (not shown, but explained below) in the receiver 130 (See FIG. 1), issues these control signals 45, 65, often referred to as "bump commands", to the code generator 40 and the multiplexer 60, so that the time delay of the pseudo-random code coincides with the time delay of the multipath component. For example, if multipath component $P_{1A}$ in FIG. 1 arrived at antenna A with a delay equal to two flip-flops, then the code generator 40 would not be "bumped" because there is already a two flip-flop delay between the code generator 40 and the correlator 20 for antenna A. However, if the same multipath component experiences another flip-flop worth of delay before reaching antenna B, the multiplexer 60 would have to be "bumped" (i.e. time delayed) so that it was in position four (i.e. corresponding to a three flip-flop delay to correlator 30). By controlling the time delay of the pseudo-random code, the data signal can be successfully demodulated from the signal received at the antennae A and B.

The output of the correlators 20, 30 are symbols representative of the transmitted data signals. These symbols must be processed further by the receiver in order to obtain the actual data signal. This action would be carried out for each multipath component in each paired rake finger 10 of a particular user until the data signal is successfully recovered.

Early-Late correlation is a process known in the art for tracking CDMA signals. The early-late process is performed by an Early-Late Gate Correlator 400 which can best be described with reference to FIG. 4. Generally, the correlator 400 takes a received signal 402 and correlates it with versions 404, 406 of the pseudo-random code which are slightly time-delayed with respect to the local reference pseudo-random code. The correlation process involves a multiplication and an integration. The multiplication is achieved by multipliers 410, 420, and the integration is achieved by associated integrators 430, 440. After the signals have been correlated, they are compared in comparison circuit 450 to determine a timing error signal.

Figure 4:
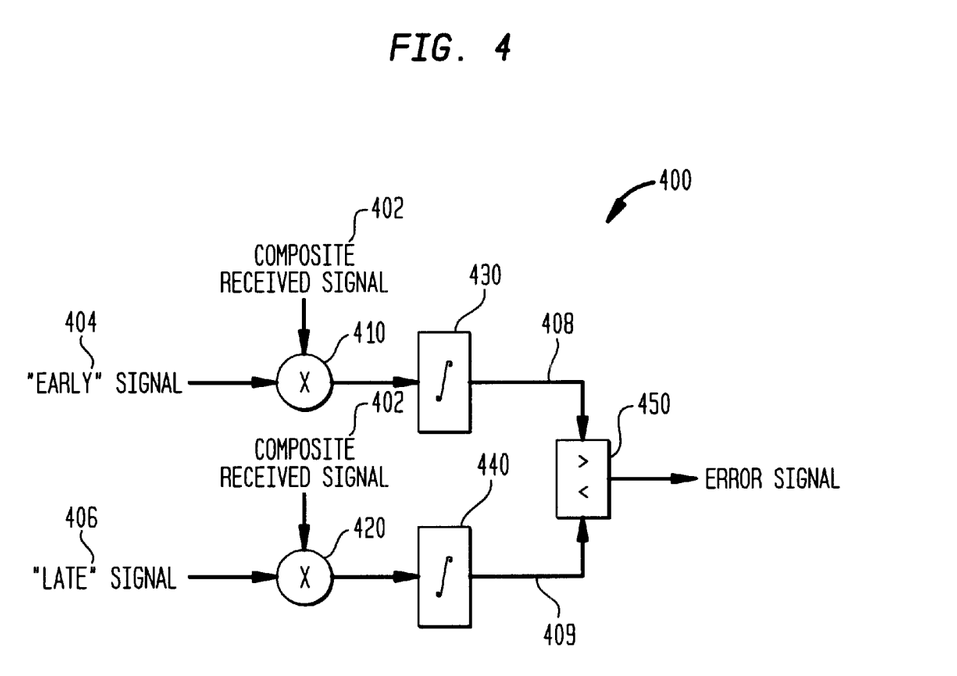
FIG. 4 is a block diagram illustrating an early-late correlation process.

The early-late correlation process will now be described. One version 404 of the pseudo-random code is given a first delay, referred to as "early" with respect to the local code (generated by code generator 40), and the other version 406 is given a second delay different than the first delay, referred to as "late" with respect to the local code. The "early" 404 and "late" 406 versions of the code are multiplied with the received signal 402 in multipliers 410 and 420, then, the multiplied signals are integrated by integrators 430, 440, producing an "early" correlation 408 and a "late" correlation 409, respectively. After correlation, the correlator 400 determines the difference between the "early" 408 and "late" 409 correlation signals in comparison circuit 450. If the comparison circuit 450 finds no difference between the "early" correlation signal 408 and the "late" correlation signal 409, then the local code is determined to be neither early nor late, and hence, there is no timing error. However, if there is a difference between the "early" correlation and the "late" correlation, this indicates a timing error, and the local code generator timing must be adjusted ("bumped") toward the greater of "early" correlation or the "late" correlation. When a timing error is detected, the Early-Late Gate Correlator 400 issues a "bump command" (i.e. time delay command) to the code generator for the particular rake finger or fingers to make the time delay of the local pseudo-random code coincide with the time delay of the received signal, so that the received signal can be accurately demodulated.

Referring again to FIG. 3, the number of flip-flops 50 that are placed between the correlator 30 and the code generator 40 is dependent on several factors. Although four are shown in the example circuit of FIG. 3, any number of flip-flops can be placed between the correlator 30 and the code generator 40.

One factor which determines the number of flip-flops is the clock rate. In FIG. 3, clock generator 70 issues clocking signals to the flip-flops 50 at a certain frequency which is known as the clock rate. The clock rate is dependent on the "chip" rate, which is a measure of the frequency of the pseudo-random code signal. The standard "chip" rate in the United States is $1.2288*10^6$ chips/second (IS-95). The clock rate is usually set at the sampling rate, which is four or eight times the "chip" rate. Hence, the clock rate would either be $4.9152*10^6$ samples/second (often referred to as a ¼ chip rate) or $9.8304*10^6$ samples/second (often referred to as a ⅛ chip rate) in most systems. Depending on how much delay is required, the number of flip-flops is set accordingly. For instance, with a ¼ chip rate, if one needed 600 ns of delay in either the positive or negative direction, then six flip-flops total would be required (i.e. three for positive delay and three for negative delay). Of course with higher chip rates, such as those proposed for use outside the United States (e.g. $4.096*10^6$ chips/second), more flip-flops would be required.

In FIG. 3, the four flip-flops 50 allow the multiple rake finger 10 to receive multipath components which lead or lag one antenna by either ¼ chip (⅛ chip per flip-flop*4 flip-flops) or ½ chip (¼ chip per flip-flop*4 flip-flops), depending on the clock rate. In the ¼ chip example, each flip-flop can provide 203.45 ns of delay, therefore the system can delay the signal one antenna receives with respect to the other by up to 406.9 ns in either the positive or negative direction. With a ⅛ chip clock, each pair of flip-flops can provide a 203.44 ns delay.

The other factor which determines the number of flip-flops 50 is the antenna separation. The maximum antenna separation will determine the number of flip-flops 50 required. For example, larger antenna separations will require more flip-flops to compensate for the delay between antennas. The minimum antenna separation is a function of the transmission frequency. For instance, if the transmission frequency were 2 GHz, the minimum antenna separation would be 7.5 cm (½*($3*10^8$ m/s /$2*10^9$ 1/s). In practice, most antennae separations will be considerably more than 7.5 cm, so exceeding this minimum is not a problem. Obviously, as the transmission frequency becomes lower, the antennae separation must increase. However, most wireless transmission frequencies require minimum antennae separations in the centimeter range, so this problem never presents itself The Flip Flops act to produce a variable controllable delay in the pseudo-random code signal. The use of the Flip Flops to effect the delay is only one arrangement that may be used in the invention; any arrangement method of generating a variable controllable delay will fulfill the requirements of the invention.

A typical antenna separation for the system described above with reference to FIGS. 1 and 2 would be approximately 3 meters. This would relate to approximately a 10 ns delay between antennae (3 m /3*$10^8$ m/s). At either a ¼ chip clock rate (4.9152*$10^6$ chips/second) or a ⅛ chip clock rate, no extra flip-flops are needed to compensate for the delay between antennae because the periods of those clock signals (203.45 ns and 101.72 ns, respectively) are large enough that the 10 ns delay is negligible. On the other hand, if the antenna separation were somewhat larger, like 30 m, extra flip-flops would be required. Then, we have a 100 ns delay between antennae, which is no longer negligible, and two flip-flops must be added when using the ⅛ chip period, in order to delay the pseudo-random signals positively or negatively by 101.72 ns.

Figure 6:
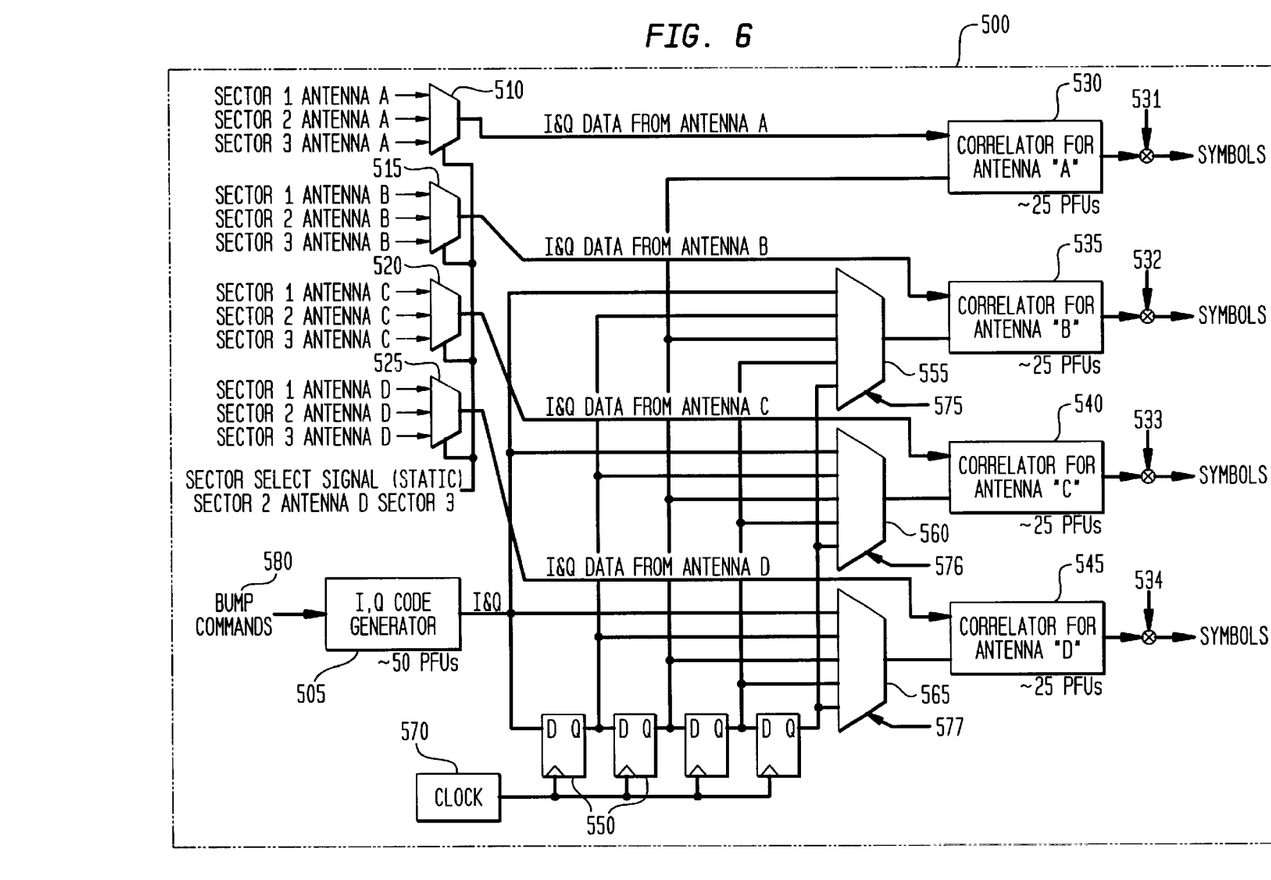
FIG. 6 is a block schematic diagram illustrating the rake finger of a second embodiment of the present invention.

FIG. 6 illustrates a rake finger 500, according to a second embodiment of the present invention, for use with a quad-antenna system. Rake finger 500 operates substantially similarly to rake finger 10, except that it includes more elements to compensate for the additional two antennae, and therefore a detailed description of its operation is omiitted here. The rake finger 500 reduces the number of code generators from the prior art quad-antenna system, as illustrated in FIG. 5, which includes four code generators 410–425 in each rake finger 400, one for each antenna A–D. The rake finger 500 of the second embodiment of the present invention combines those four code generators 410–425 into a single code generator 505. This process of combining code generators is also done when fabricating the code generator 40 of the first embodiment (FIG. 3) from the two code generators 210, 220 shown in the prior art rake finger 200(FIG. 2). Note that above, the rake finger 10 was referred to as a "multiple" rake finger because it included a pair of correlators 20, 30 for every one code generator 40. Similarly, rake finger 500 is also a multiple rake finger, except that it includes four correlators 535–545 for every one code generator 505.

Although the invention has been described as having two or four correlators with each code generator, the invention is not so limited and any number of correlators can be used. For example, three, five or six correlators can be used with each code generator.

As previously noted, rake finger 500 is similar in many respects to rake finger 10, except that it includes more elements to compensate for the additional two antennae. In addition to code generator 505, rake finger 500 includes first through fourth multiplexers 510–525, first through fourth correlators 530–545, and first through fourth beamforming inputs 531–534. As described above, the beamforming inputs assist in the sectoring of the antenna coverage area. As with rake finger 10 in FIG. 3, a delay circuit comprised of flip-flops 550 and multiplexers 555–565 is interposed between the code generator 505 and the respective correlators 530–545. The delay circuit is controlled by a clock 570 connected to each of the flip-flops 550. Each of the multiplexers 555–565 receives control commands 575–577, respectively, indicating the amount of time delay provided to each correlator. The code generator 505 also receives control commands 580 controlling the time delay of the signal generated by the code generator. As with rake finger 10, rake finger 500 receives control ("bump") commands 575–577 and 580 from an Early/Late Gate Correlator indicating the time delay that should be provided to the multiplexers 555–565 and the code generator 505 to effectuate clear reception of the incoming signal.

Figure 7:
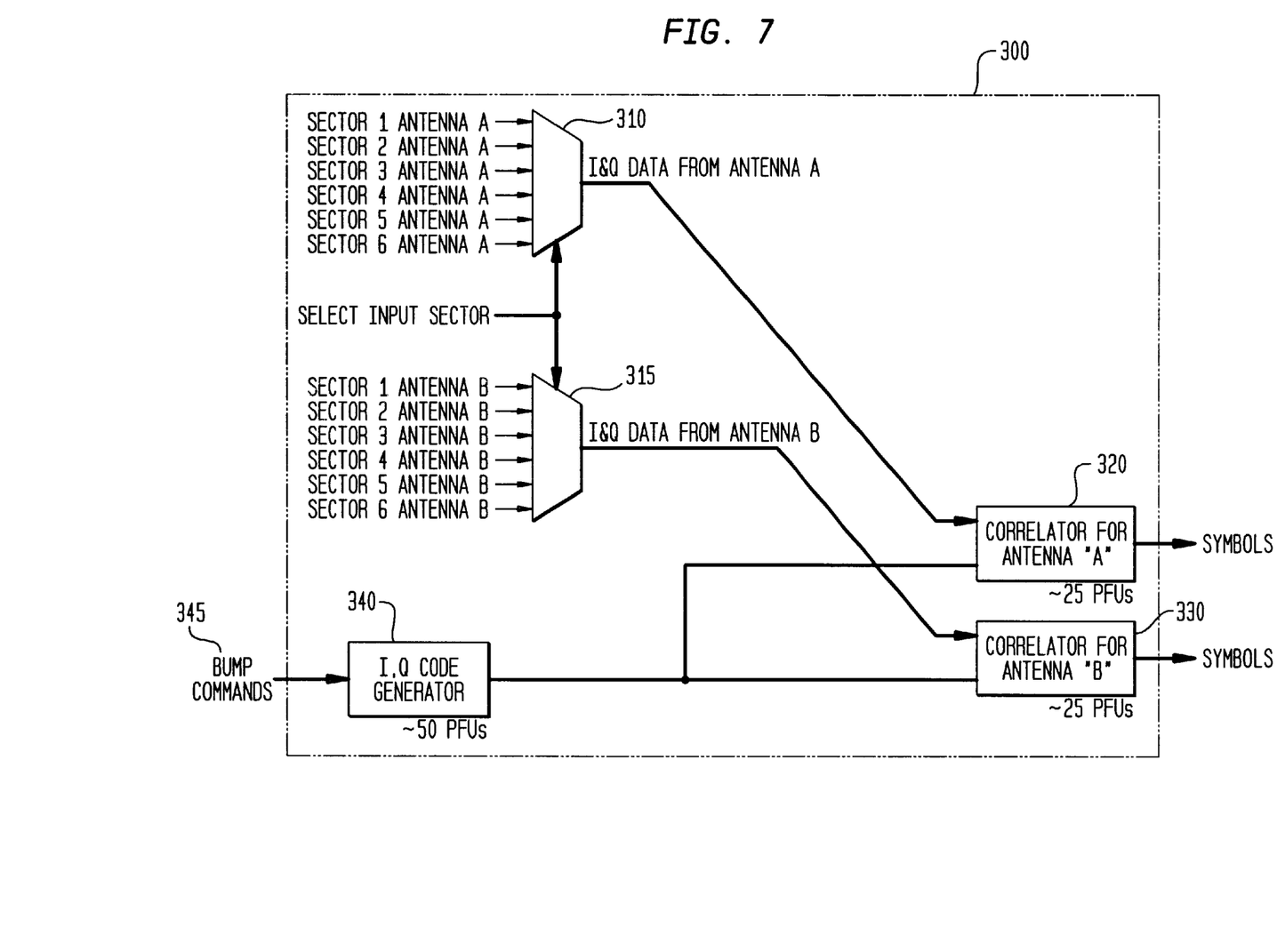
FIG. 7 illustrates a third embodiment of the present invention where the rake finger shown in FIG. 3 is used as a searcher.

FIG. 7 is a block diagram illustrating a third embodiment of the present invention, where a multiple rake finger (e.g. rake finger 10) is used as a searcher 300. A searcher is a portion, usually one of the rake fingers, of a CDMA receiver which looks for multipath components and attempts to discern when the strongest correlation takes place between the components. In other words, the searcher gathers several multipath signals at a certain time, then it "bump" to another time and gathers more multipath signals. This process continues for a set number of time intervals. The number of time intervals is related to how far the user might be from the base station (i.e. the further the user may be, the more time intervals that are required). The searcher then compares each set of signals against one another to determine at what time interval the highest degree of correlation occurs. This process takes a substantial amount of time with multiple antenna systems, as the above process must be run for each antenna separately. However, by using a variant 300 of the multiple rake finger of the preferred embodiment of the present invention, the searching for both antennae can be done simultaneously, thereby reducing the search time by fifty percent.

The searcher 300 does not require the additional delay circuitry (i.e. flip-flops 50 and multiplexer 60 in FIG. 3) to perform its functions. The searcher 300 only requires a code generator 340, correlators 320, 330, and multiplexers 310, 315. The searcher 300 receives its "bump" (i.e. time delay) commands from a searcher controller (not shown) through control signal 345, which varies the timing of the code generator 340 according to the preferred search pattern. A common pattern may comprise a timing signal which is sequentially increased from the smallest to the largest delay to be searched. Other more complex search patterns are possible, however, the particular pattern is immaterial to the operation of the present invention. Thus, both correlators 320, 330 are time delayed by the same amount so that the searcher 300 can perform the functions described above.

It should be noted that the same electrical connections shown in FIG. 7 can be accomplished with the circuitry of FIG. 3 if the multiplexer 60 is locked at its center position. This would provide the same delay to both correlators 320, 330, as is the case in FIG. 7. Then, the circuitry of FIG. 3 could be used for both searching and demodulating. Further, the rake finger 500 of FIG. 6 can also be configured for use as a searcher, by either eliminating the delay circuitry (i.e. flip-flops 550 and multiplexers 555–565), or by setting all three multiplexers 555–565 to their center position as described above.

Although the present invention has been described for use with a CDMA communication system, the invention may also be used with any similar communication system which utilizes correlators and code generators. Further, even though the present invention has been described for use with an early-late correlation process, any other suitable tracking scheme known to those skilled in the art may be utilized. Additionally, although the present invention has been described for use with a base station receiver, it has possible application to user receivers provided the minimum antenna separation is maintained.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. An apparatus for providing a digital radio link comprising:
   at least two antennae located at a fixed unit; and, a receiver connected to said at least two antennae and including at least one multiple rake finger, said multiple rake finger comprising
   at least two correlators connected to respective ones of said at least two antennae, and
   a code generator providing pseudo-random signals to each of said at least two correlators.

2. The apparatus of claim 1, wherein said multiple rake finger further comprises a first delay circuit connected between said code generator and said at least two correlators, said delay circuit providing time-delayed pseudo random signals to said at least two correlators.

3. The apparatus of claim 2, wherein said first delay circuit comprises a first delay component and a second delay component, said first component providing a first time-delayed pseudo-random signal to one of said at least two correlators and said second component providing a second time-delayed pseudo-random signal to another other of said at least two correlators.

4. An apparatus for providing a digital radio link comprising:
   at least two antennae located at a fixed unit; and,
   a receiver connected to said at least two antennae and including at least one multiple rake finger, said multiple rake finger comprising,
   a code generator;
   at least two correlators connected to said at least two antennae, said code generator providing pseudo-random signals to said at least two correlators;
   a first delay circuit connected between said code generator and said at least two correlators, said delay circuit providing time-delayed pseudo random signals to said at least two correlators and comprising, a first delay component and a second delay component, said first component providing a first time-delayed pseudo-random signal to one of said at least two correlators and said second component providing a second time-delayed pseudo-random signal to another other of said at least two correlators; and
   a multiplexer connected between said one of said at least two correlators and said first delay circuit, said multiplexer operating to select the amount of delay associated with said first time-delayed pseudo-random signal.

5. The apparatus of claim 4, wherein said multiplexer is locked in a specific state so that said first time-delayed pseudo-random signal is of the same time delay as said second time-delayed pseudo-random signal.

6. The apparatus of claim 3, wherein said first and second delay components each comprise at least one flip-flop.

7. The apparatus of claim 2, wherein said multiple rake finger further comprises a second delay circuit connected to an input of said code generator, said second delay circuit operating to delay said pseudo-random signals which are issued from said code generator.

8. A multiple access digital transmission system comprising:
   at least two antennae; and
   a receiver connected to said at least two antennae and including at least one multiple rake finger, said multiple rake finger comprising:
   at least two correlators corresponding to and coupled to respective ones of said at least two antennae,
   a code generator providing pseudo-random signals to each of said at least two correlators, and
   a delay circuit connected between said code generator and said at least two correlators for providing time-delayed pseudo-random signals to said at least two correlators.

9. The system of claim 8, wherein said delay circuit comprises a first delay component and a second delay component, said first delay component providing a first time-delayed pseudo-random signal to one of said at least two correlators and said second delay component providing a second time-delayed pseudo-random signal to another other of said at least two correlators.

10. A multiple access digital transmission system comprising:
    at least two antennae; and
    a receiver connected to said at least two antennae and including at least one multiple rake finger, said multiple rake finger comprising:
    a code generator;
    at least two correlators corresponding to said at least two antennae, said code generator providing pseudo-random signals to said at least two correlators; and
    a delay circuit connected between said code generator and said at least two correlators for providing time-delayed pseudo-random signals to said at least two correlators and comprising,
    a first delay component providing a first time-delayed pseudo-random signal to one of said at least two correlators,
    a second delay component providing a second time-delayed pseudo-random signal to another other of said at least two correlators, and
    a multiplexer connected between said one of said at least two correlators and said first delay circuit, said multiplexer operating to select the amount of delay associated with said first time-delayed pseudo-random signal.

11. The apparatus of claim 10, wherein said multiplexer is locked in a specific state so that said first time-delayed pseudo-random signal is of the same time delay as said second time-delayed pseudo-random signal.

12. The apparatus of claim 9, wherein said first and second delay components each comprise at least one flip-flop.

13. The apparatus of claim 8, wherein said multiple rake finger further comprises a second delay circuit connected to an input of said code generator, said second delay circuit operating to delay said pseudo-random signals which are issued from said code generator.

14. A method of operating a digital transmission system comprising the steps of:
    receiving a signal on at least two different antennae;
    transmitting said received signal to at least two correlators, each correlator corresponding to a different antenna;
    transmitting a pseudo-random code to each of said at least two correlators, said code generated by a code generator.

15. A method of operating a digital transmission system comprising the steps of:

receiving a signal on at least two different antennae;

transmitting said received signal to at least two correlators, each correlator corresponding to a different antenna;

transmitting a pseudo-random code to said at least two correlators, said code generated by a single code generator, wherein said pseudo-random code is time-delayed before it is transmitted to said at least two correlators.

16. The method of claim 15, wherein said pseudo-random code is time-delayed by a first amount before it is transmitted to one of said at least two correlators, and said pseudo-random code is time-delayed by a second amount before being transmitted to another other of said at least two correlators.

17. A multiple access digital receiver comprising:

at least two antennae; and at least one multiple rake finger, said multiple rake finger comprising at least two correlators, each of said at least two correlators coupled to respective ones of said at least two antennae, and a code generator providing pseudo-random signals to each of said at least two correlators.

18. The receiver of claim 17, wherein said multiple rake finger further comprises a first delay circuit connected between said code generator and said at least two correlators, said delay circuit providing time-delayed pseudo random signals to said at least two correlators.

19. The receiver of claim 18, wherein said first delay circuit comprises a first delay component and a second delay component, said first delay component providing a first time-delayed pseudo-random signal to one of said at least two correlators and said second delay component providing a second time-delayed pseudo-random signal to another other of said at least two correlators.

20. A multiple access digital receiver comprising:

at least one multiple rake finger, said multiple rake finger comprising, a code generator;

at least two correlators, said code generator providing pseudo-random signals to said at least two correlators;

a first delay circuit connected between said code generator and said at least two correlators, said delay circuit providing time-delayed pseudo random signals to said at least two correlators and comprising, a first delay component providing a first time-delayed pseudo-random signal to one of said at least two correlators, a second delay component providing a second time-delayed pseudo-random signal to another other of said at least two correlators; and a multiplexer connected between said one of said at least two correlators and said first delay circuit, said multiplexer operating to select the amount of delay associated with said first time-delayed pseudo-random signal.

21. The receiver of claim 20, wherein said multiplexer is locked in a specific state so that said first time-delayed pseudo-random signal is of the same time delay as said second time-delayed pseudo-random signal.

22. The receiver of claim 19, wherein said first and second delay components each comprise at least one flip-flop.

23. The receiver of claim 18, wherein said multiple rake finger further comprises a second delay circuit connected to an input of said code generator, said second delay circuit operating to delay said pseudo-random signals which are issued from said code generator.

24. A searcher for use with a multiple access digital communication system comprising:

at least two antennae; and at least one multiple rake finger, said at least one multiple rake finger comprising at least two correlators, each of said at least two correlators coupled to respective ones of said at least two antennae, and a code generator providing pseudo-random signals to each of said at least two correlators.

25. A searcher for use with a multiple access digital communication system comprising:

at least one multiple rake finger, said at least one multiple rake finger comprising a code generator and at least two correlators, said code generator providing pseudo-random signals to said at least two correlators, wherein said pseudo-random signals are time-delayed by a delay circuit connect to an input of said code generator before being provided to said at least two correlators, and wherein said delay circuit periodically changes said time delay so that said at least two correlators are provided with a pseudo-random code which is of a different time-delay amount each time said delay circuit periodically changes.

26. The searcher of claim 25, wherein said pseudo-random code which said at least two correlators receives is time delayed by the same amount.

\* \* \* \* \*